United States Patent [19]

McDonald et al.

[11] Patent Number: 4,500,502

[45] Date of Patent: Feb. 19, 1985

[54] PROCESS FOR REMOVING IMPURITIES FROM WET PROCESS OF PHOSPHORIC ACID

[75] Inventors: Daniel P. McDonald; James C. Wade, both of Yazoo City, Miss.

[73] Assignee: Mississippi Chemical Corporation, Yazoo City, Miss.

[21] Appl. No.: 508,469

[22] Filed: Jun. 28, 1983

[51] Int. Cl.³ .............................................. C01B 25/16
[52] U.S. Cl. .................. 423/321 R; 423/310; 423/317; 71/43
[58] Field of Search ............... 423/316, 317, 319, 320, 423/321 R, 321 S, 310; 71/43

[56] References Cited

U.S. PATENT DOCUMENTS

| | | | |
|---|---|---|---|
| 3,328,123 | 6/1967 | Parks et al. | 423/321 R |
| 3,554,728 | 1/1971 | Moore et al. | 71/33 |
| 3,632,329 | 1/1972 | Tillman et al. | 71/34 |
| 3,975,178 | 8/1976 | McCullough et al. | 423/321 S |

Primary Examiner—Gregory A. Heller
Attorney, Agent, or Firm—Oblon, Fisher, Spivak, McClelland & Maier

[57] ABSTRACT

A method of preparing a purified ammoniated phosphoric acid composition, comprising, reacting an aqueous wet process phosphoric acid with an ammonium ion source at a $N/P_2O_5$ weight ratio ranging from about 0.06 to about 0.15 in the presence of solid phase metal ion containing impurities for a time sufficient to precipitate the majority of the impurities in the acid, the impurity precipitation comprising at least several complex metal salts at least one of which contains magnesium, aluminum and fluorine, and obtaining the purified ammoniated phosphoric acid by separating the precipitated impurities therefrom.

26 Claims, 8 Drawing Figures

PROCESS FOR REMOVING IMPURITIES FROM WET PROCESS OF PHOSPHORIC ACID

BACKGROUND OF THE INVENTION

1. Field of the Invention

The present invention relates to a method of removing metal ion containing impurities from wet process phosphoric acid. More particularly, the present invention relates to a process of precipitating magnesium and other metal ion impurities from wet process phosphoric acid by ammoniation.

2. Description of the Prior Art

Wet process phosphoric acid is made by the acidulation of phosphate rock with sulfuric acid. Gypsum is the main by-product of the reaction. Phosphate rock contains many different types and amounts of mineral impurities and these impurities are solubilized by the process resulting in incorporation of the impurities in the product acid. Because the quality of phosphate rock is declining as the better grades of the mineral are being removed by mining, the impurity levels in the wet process acid being obtained from this rock have been increasing.

The presence of impurities in wet process phosphoric acid results in a variety of problems for those who manufacture N-P and N-P-K fertilizers. One problem is that the presence of the impurities dilutes the nitrogen, $P_2O_5$ and potassium contents of the fertilizer thus resulting in a lower grade fertilizer product. Impurities precipitate from the phosphoric acid and settle from solution during storage of the acid thereby resulting in sludge accumulation in storage tanks, transfer lines and other apparatus sections. Some of the impurities present in the acid such as aluminum salts actually make the wet process acid more difficult to concentrate. Still further, some impurities in the acid, despite processing of the acid for removal of the impurities, are not removed from the acid and appear in liquid fertilizer products where they then can precipitate resulting in (1) a build-up of solids in storage tanks which effectively reduces storage capacity and results in reprocessing and cleaning costs; (2) the gradual formation of precipitated solid matter in transportation equipment such as barges, railcars and the like causing product loss and equipment cleansing costs; (3) the clogging of liquid fertilizer application equipment, particularly orifices through which the fertilizer is applied; (4) solids which tie up $P_2O_5$ in a form that is unavailable to crops (i.e., citrate insoluble form); (5) general dissatisfaction by the consumer of the product.

Because of the desirability of removing impurities from wet process acid, a number of different impurity removal methods have been developed. One such method is solvent extraction, of which there are a number of variations developed to the point of commercial availability. Basically, solvent extraction involves the extraction of either $P_2O_5$ or impurities from wet process acid, while leaving other components behind in the aqueous phase. Significant disadvantages of solvent extraction are the high capital and operating costs and the fact that organic solvents must be handled.

A second type of impurity removal process is concentration/clarification of wet process phosphoric acid. In the first step of the process, wet process acid is concentrated to 70% $P_2O_5$ (super acid) and some of the impurities are allowed to precipitate and settle from the concentrate. However, there are several major disadvantages to the process which are: (1) the high energy consumption involved in concentrating the acid to 70% $P_2O_5$, (2) the extreme difficulty in concentrating acid from the low quality phosphate rock, (3) the cost of large clarification equipment, and (4) the inability to remove impurities to very low levels. Further, if the acid is concentrated by either direct-fired concentration or by submerged combustion, atmospheric pollution becomes a problem.

Another general method of removing metal impurities from wet process acid involves the ammoniation of wet process acid. Metal impurities normally found in phosphate rock include $MgO$, $Al_2O_3$ and $Fe_2O_3$ as some of the more prominent impurities. Early efforts in this technique include the work of E. C. Houston et al as described in *Ag and Food Chemistry*, 3(1), 43-48, 1955. The process described involves the removal of impurities by the ammoniation of wet process acid. Ammoniation of the wet process acid (24.3% $P_2O_5$) to a $N/P_2O_5$ ratio of 0.37 results in the precipitation of $Fe_2O_3$, $Al_2O_3$ and $CaO$ impurities. No disclosure is made of $MgO$ precipitation. The relatively high $N/P_2O_5$ ratio makes processing the product into some finished fertilizer products both difficult and undesirable. Moreover, because the wet process acid is ammoniated to a relatively high initial pH or $N/P_2O_5$ ratio, much valuable exothermic heat of reaction is lost and is not available for further processing of the acid.

Fitz-William, Jr. et al in U.S. Pat. No. 3,544,298 describe a process in which magnesium impurities can be removed from wet process acid. In the disclosed process superphosphoric acid (about 70% $P_2O_5$) is ammoniated to a $N/P_2O_5$ ratio of about 0.41. Upon cooling of the mixture to 60° C., magnesium containing impurities precipitate. Subsequently, the solid and liquid phases are separated. The liquid phase is reduced to a $MgO/P_2O_5$ ratio of $59 \times 10^{-4}$ from a starting wet process acid which has a $MgO/P_2O_5$ ratio of $145 \times 10^{-4}$; this difference representing a 59% $MgO$ reduction. However, no other impurities are disclosed as being precipitated by the process. Disadvantages of this process are the high costs of making superphosphoric acid and the problems of handling high $N/P_2O_5$ weight ratio solutions.

The wet process acid treatment process disclosed by Moore et al in U.S. Pat. No. 3,554,728 is similar to that of Fitz-William, Jr. et al in that a superphosphoric acid (66-76% $P_2O_5$) is ammoniated to a process solution having a $N/P_2O_5$ ratio of 0.37-0.45. However, the reference then cools the solution to precipitate solids. After separation of the solids, the solution is made more acidic by adding crude wet process acid to the solution or by vaporizing ammonia from the solution to provide a liquid material having a reduced Mg content. Water is added to the solution to provide a liquid fertilizer product. However, the process has the disadvantage that a plurality of process steps are required thereby increasing costs. A significant drawback is that after the initial acid solution is ammoniated to a high $N/P_2O_5$ ratio, the pH of the solution must be notably decreased by either vaporizing ammonia, thereby necessitating greater expenditures of energy, or by adding crude wet process acid to the solution which naturally will add impurities back into the acid.

Another prior art process disclosed by Knarr in U.S. Pat. No. 3,619,161 shows the clarification of wet process acid of carbonaceous impurities by treatment of the acid with a water-immiscible organic liquid. The reference does not show the precipitation of mineral impurities from wet process acid.

The Burch et al reference, U.S. Pat. No. 3,625,672, similar to other prior art processes discussed above, shows the precipitation of magnesium impurities from wet process acid by ammoniation of the acid to a high $N/P_2O_5$ ratio or a high pH of 6.0 to 6.2. The low initial partial ammoniation process of the present invention is neither shown nor suggested by Burch et al.

The Tillman et al reference, U.S. Pat. No. 3,632,329 discloses a process specifically designed to remove magnesium impurities from ammonium phosphate fertilizer solutions by seeding the same with magnesium ammonium pyrophosphate. The reference does not show or suggest a process of precipitating mineral (magnesium) impurities by the direct ammoniation of wet process acid.

The Moore et al reference, U.S. Pat. No. 3,642,439, discloses a process of removing magnesium impurities from wet process acid by maintaining the HF and the soluble aluminum content at stated levels while concentrating wet process acid by evaporation of water to a concentrated acid of 45–53 wt % $P_2O_5$. The magnesium containing impurities settle from solution while the solution is held at a temperature of 50°–100° C. The reference does not show the precipitation of magnesium containing impurities by the direct ammoniation of wet process acid.

The Mills reference, U.S. Pat. No. 4,136,199, discloses a method for removing metal ion impurities from wet process acid by adding to the acid, calcium and fluorine ions, which addition causes the precipitation of a fluoride ion containing solid, which solid also contains such metal ions as magnesium and aluminum. Nowhere, however, does the reference show the precipiation of impurities from wet process acid by the direct ammoniation of the same.

The Huber reference, U.S. Pat. No. 3,201,195, shows a method of precipitating substantially pure alkali metal and ammonium phosphate compounds from wet process acid and accordingly, as such is not concerned with the precipitation of metal ion impurities from wet process acid.

The Kenton reference, U.S. Pat. No. 3,926,610, and the Burkert et al reference, U.S. Pat. No. 3,630,711, relate to aspects of wet process acid treatment technology other than the direct ammoniation of wet process acid.

U.S. Pat. No. 4,325,927 (Charles W. Weston, et al) also discloses an impurity removal process by the ammoniation of wet process phosphoric acid. This patent teaches a two-stage ammoniation process. In the first stage, wet process phosphoric acid which has been obtained by diluting concentrated phosphoric acid is ammoniated to a pH of 1.5–2.5 and the reaction mass is aged for about 30 minutes. The pH is then raised to 4–5 by additional ammoniation and the solid and liquid phases are separated. A significant teaching of this patent is that the phosphoric acid being purified must have a low fluorine content; i.e., the phosphoric acid should contain no more than about 2.0% by weight fluorine. Under these conditions, a fluorine-free solid having the chemical composition $(Al,Fe)NH_4(HPO_4)_2 \cdot \frac{1}{2}H_2O$ is precipitated. Some disadvantages of this process are: (1) handling a liquid phase product at a high $N/P_2O_5$ ratio which has a relatively low salting-out temperature; (2) the cost of first concentrating the phosphoric acid, diluting it for processing, and reconcentrating the final liquid phase; (3) the need to use a feed acid which has a relatively low fluorine concentration; and (4) producing a final liquid phase product which is unsuitable for direct conversion into an ammonium polyphosphate liquid fertilizer.

One technique for alleviating problems caused by impurity precipitation is based upon the addition of hydrogen fluoride to the ammonium polyphosphate liquid fertilizer product. This method is based on the phenomenon that the HF sequesters the impurities, rather than precipitating them. Accordingly, the impurities remain in the fertilizer product and are not removed. Since under some conditions the impurities can still precipitate from solution, the presence of the impurities in the fertilizer product constitutes a continuous potential disadvantage of using this technique. Moreover, the amount of plant nutrients present in the fertilizers produced is reduced proportionally by the amount of fluoride added. Other disadvantages are that excess fluoride ion in the fertilizer product can cause corrosion of aluminum storage tanks and can cause fluid fertilizer products to be unsuitable for use as an animal feed supplement. Still further, the large amounts of HF required by the process substantially increase fluid fertilizer production costs.

A need, therefore, continues to exist for a technique of simply removing metal impurities from wet process phosphoric acid before it is used to make phosphate-based fertilizers.

SUMMARY OF THE INVENTION

Accordingly, one object of the present invention is to provide a process by which impurities, especially metal ion impurities, present in wet process phosphoric acid can be substantially removed by precipitation.

Another method of the present invention is to provide a process by which magnesium ion impurities present in wet process phosphoric acid can be reduced.

Yet another object of the invention is to provide an ammoniated liquid phosphate material which can be converted to a liquid fertilizer that can be stored for extended periods of time without encountering solids precipitation and settling problems.

Still another object of the present invention is to produce a phosphatic material which can be converted into a high-purity granular ammonium ortho- or polyphosphate fertilizer having higher plant nutrient content than those made from impurity-containing phosphoric acid.

Briefly, these objects and other objects of the present invention as hereinafter will become more readily apparent can be attained by a method of preparing a purified ammoniated phosphoric acid composition by reacting an aqueous wet process phosphoric acid with an ammonium ion source at a $N/P_2O_5$ weight ratio ranging from 0.06 to 0.15 in the presence of solid phase metal ion containing impurities for a time sufficient to precipitate the majority of the metal impurities in said acid, said impurity precipitation comprising several complex metal salts at least one of which contains magnesium, aluminum and fluoride ions, and obtaining the purified ammoniated phosphoric acid by separating the precipitated impurities therefrom.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
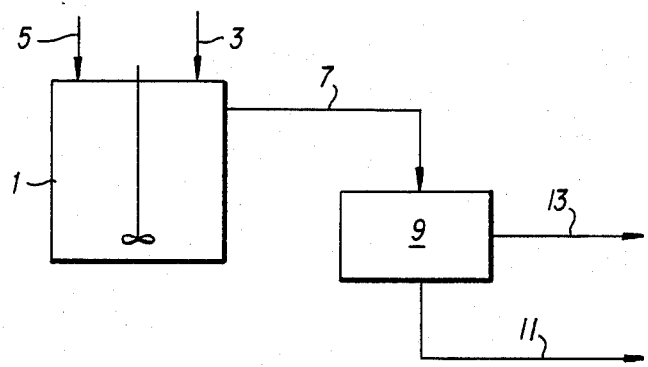
FIG. 1 is a flow diagram of the basic process of the invention in which wet process phosphoric acid is reacted with solid ammonium phosphate in order to precipitate metal containing impurities from the acid.

The central feature of the present invention is that a method has now been provided by which impurities, especially metal ion impurities, can be precipitated from wet process phosphoric acid at lower $N/P_2O_5$ weight ratios than shown effective in prior art processes, at relatively short processing time, and which can be separated from the product phosphoric acid at acceptable rates and $P_2O_5$ yields. When wet process acid is ammoniated to an appropriate $N/P_2O_5$ ratio in the presence of a seed solid, which itself is a precipitated metal ion containing material obtained from the process, precipitation of metal ions as several complex metal salts occurs which results in the removal of most of the metal ion impurities from the wet process acid. The material which precipitates from solution contains a plurality of complex salts of which three are:

1. $Fe(NH_4)(HPO_4)_2 \cdot 0.5H_2O$
2. $MgAl(NH_4)(HPO_4)_2F_2 \cdot 4H_2O$ and
3. $Al(NH_4)(HPO_4)F_2 \cdot H_2O$ The precipitation of the mixture of complex salts achieves the objective of removing magnesium from the wet process phosphoric acid. Identification of complex salt #2, above, is described in Example 5. Removal of magnesium impurities from the wet process acid is an especially desired objective because precipitation of sludge from liquid ammoniated phosphate fertilizer such as ammoniated polyphosphate is sensitive to MgO content in the liquid fertilizer. Very little precipitation of impurities occurs from liquid ammonium polyphosphate when the MgO content is less than 0.2 wt. %. Above 0.2 wt. % MgO, precipitation of solids increases from the liquid fertilizer and is a very serious problem above 0.3 wt. % MgO.

Consideration of the formulas of three of the precipitated complex salts shows that fluoride ion is a component of two of the salts. Thus, the present process is effective in removing fluoride ion from wet process acid, and indeed wet process acid of any fluoride ion concentration can be used in the present process. This fact represents a clear line of distinction between the present process and the process disclosed by Weston et al where it is essential to employ a wet process acid which has a fluoride ion concentration of about 2% by weight or less.

There are several ways in which the impurity precipitation process of the present invention may be achieved. In the first method (Method I), impurity containing or crude solid ammonium phosphate is added to wet process phosphoric acid in an amount such that the $N/P_2O_5$ ratio of the mixture is within the required range. The mixture is allowed to stand for a time sufficient to achieve the precipitation of the abovementioned complex salts from solution. Thereafter, separation of the liquid phase from the solid phase is done by whatever means desired such as by filtration and the desired liquid ammoniated phosphate product is obtained.

In a second embodiment of the process (Method II), the solid impurity phase from Method I above is added to wet process phosphoric acid. The solution is then ammoniated, usually by the addition of anhydrous ammonia, until the desired $N/P_2O_5$ weight ratio is attained. The mixture is allowed to age for a time sufficient to achieve precipitation of the metal ion containing complex salts. Liquid and solid phases can then be separated by any desired adequate technique.

In a third, more preferred embodiment of the process (Method III), wet process phosphoric acid is ammoniated to a $N/P_2O_5$ weight ratio of 0.15 or greater to achieve the precipitation of a material which contains active seed solids for the subsequent precipitation of impurities. To this liquid-solid mixture is added additional wet process phosphoric acid and ammonium ion source so that as the mixture is allowed to age, it ages over the desired low $N/P_2O_5$ weight ratio range. Once the seed solids have been established, the $N/P_2O_5$ weight ratio need not be raised again above the desired range. After impurity precipitation is complete, the desired liquid ammoniated phosphate product is separated from the precipitated solid impurity.

The fourth embodiment of the invention (Method IV) is similar to Method III. Wet process phosphoric acid is ammoniated to a high enough $N/P_2O_5$ weight ratio (0.15 or greater) to achieve precipitation of seed solids. This liquid-solid mixture is added to additional wet process phosphoric acid until the final mixture attains the desired $N/P_2O_5$ weight ratio. The mixture is allowed to stand for a time sufficient to achieve precipitation of the metal ion containing impurity salts and phase separation is effected.

In a fifth embodiment of the invention (Method V), wet process phosphoric acid is ammoniated to only within the limits of the desired low $N/P_2O_5$ range (0.06–0.15) and the mixture is allowed to stand for a prolonged period of time until active, solid material precipitates. The liquid-solid material is then added to wet process acid which is ammoniated to a level within the desired low $N/P_2O_5$ weight ratio range. The mixture is allowed to stand until impurity precipitation is complete, and thereafter the desired liquid fertilizer product is obtained upon separation of solids therefrom.

In all of the embodiments of the reaction described above, the process may be conducted on a batch, semicontinuous or continuous basis. Also the seed solids which have been generated may be fed to the process in either a solid or a slurry form. It should be understood that seed solids are required to initiate impurity precipitation. Once impurity precipitation has begun, additional seed solids need not be added, the precipitated impurities themselves act as seed solids. FIGS. 1 to 8 provide a more detailed description of the various process embodiments of the present invention.

FIG. 1 is a flow diagram of an embodiment of the present process in which solid ammonium phosphate and wet process phosphoric acid are passed into reaction vessel 1 through lines 3 and 5 respectively. After the reaction and precipitation of impurities from solution, the mixture is discharged from vessel 1 through line 7 into phase separation unit 9 wherein, upon separation of the precipitated impurities from the liquid phase, liquid is withdrawn through line 11 and solid precipitate is withdrawn through line 13.

Figure 2:
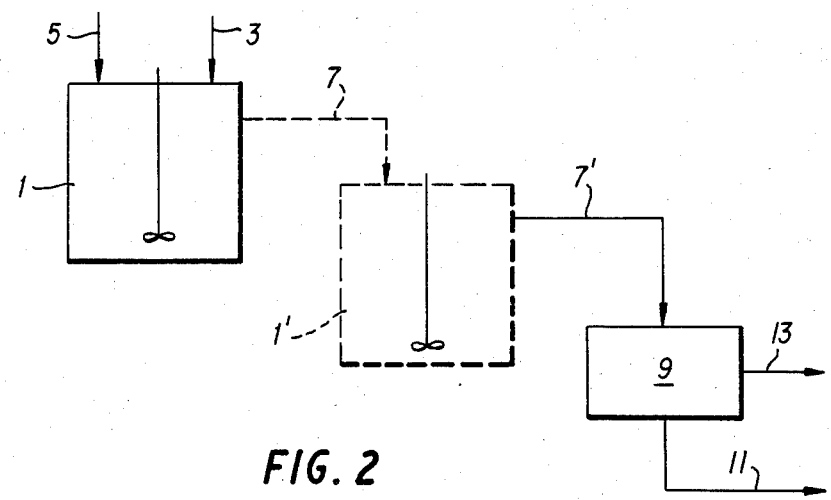
FIG. 2 is the process of FIG. 1 with the exception that a plurality of reaction vessels is employed instead of only one reactor.

FIG. 2 shows essentially the same process scheme as shown in FIG. 1 except that it contains an additional reaction vessel 1' in series with the first reaction vessel. More than two reaction vessels can be used if desired. Reaction mixture is withdrawn through line 7' into the phase separation unit 9.

Figure 3:
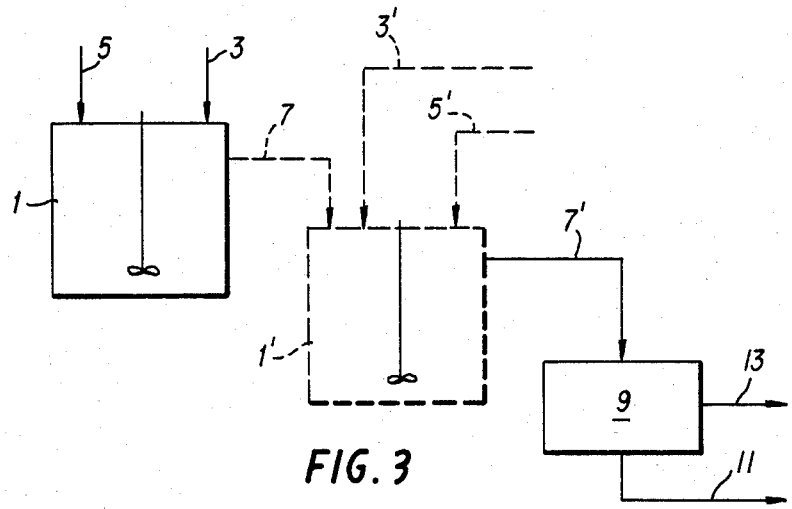
FIG. 3 is the process of FIG. 2 with the exception that the multiple reaction vessels are provided with multiple feed lines instead of feed lines only to the initial reaction vessel.

FIG. 3 shows a process scheme which is a variation of the multiple reactor scheme of FIG. 2. In this concept solid ammonium phosphate and wet process acid are passed into the second reaction vessel 1' in series with the first reaction vessel through lines 3' and 5' respectively. If more than two reaction vessels are present in the system, these vessels optionally may also have separate solid ammonium phosphate and wet process acid feed lines.

Figure 4:
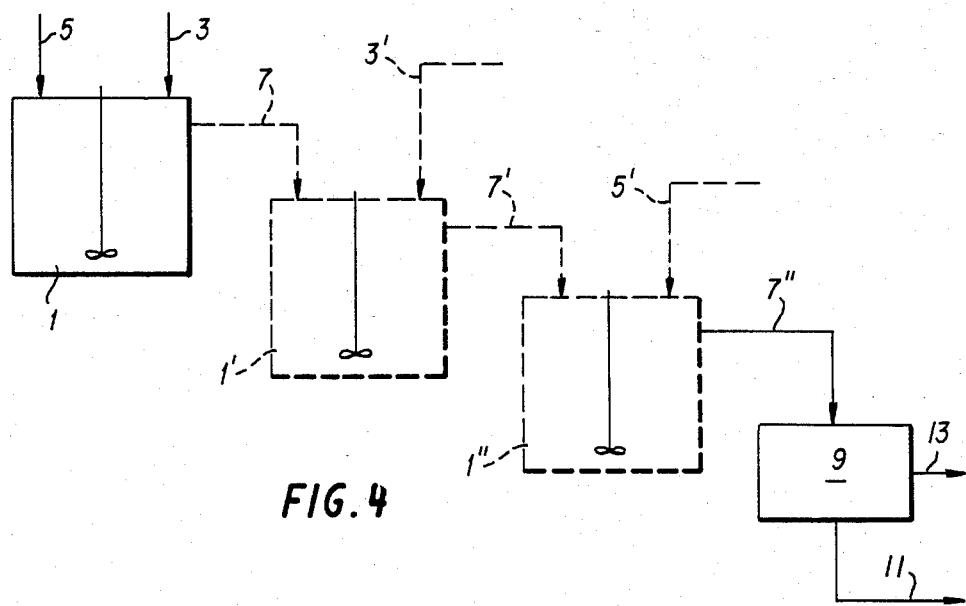
FIG. 4 is the process scheme of FIG. 3 except that the reaction vessels are provided with split feed lines.

FIG. 4 shows still another variation of the multiple reactor process in which the solid ammonium phosphate and wet process acid feed lines are split. In this case solid ammonium phosphate or wet process acid is fed through line 3' into the second reaction vessel 1' in series, while wet process acid or solid ammonium phosphate, depending on whether ammonium phosphate or wet process acid was fed into the system through line 3', is fed into the third reaction vessel 1" in series.

Figure 5:
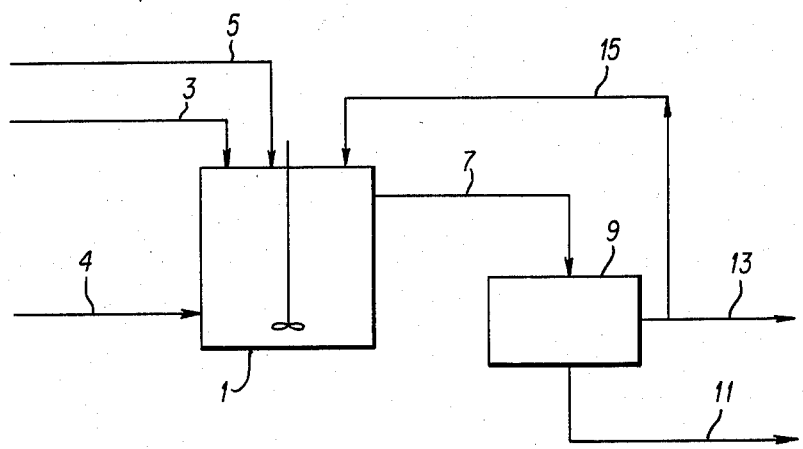
FIG. 5 represents an embodiment of the present process in which the continuous process is started with an initial charge of ammonium phosphate and maintained by the recycling of solids to the reactor.

FIG. 5 shows the embodiment of the present invention in which precipitated solids are recycled to the reaction vessel 1 in order to supply the solid seed material to facilitate the impurity precipitation process. The reaction vessel 1 is provided with inlet feed lines 3, 4 and 5 for solid ammonium phosphate, ammonia and wet process acid respectively. (Solid ammonium phosphate is only fed to the reaction vessel initially to start the precipitation process in the initial charge to the reaction vessel.) As indicated above, a portion of the solid phase material separated in phase separation unit 9 is recycled through line 15 into the reactor to provide solid seed material in the continuous process.

Figure 6:
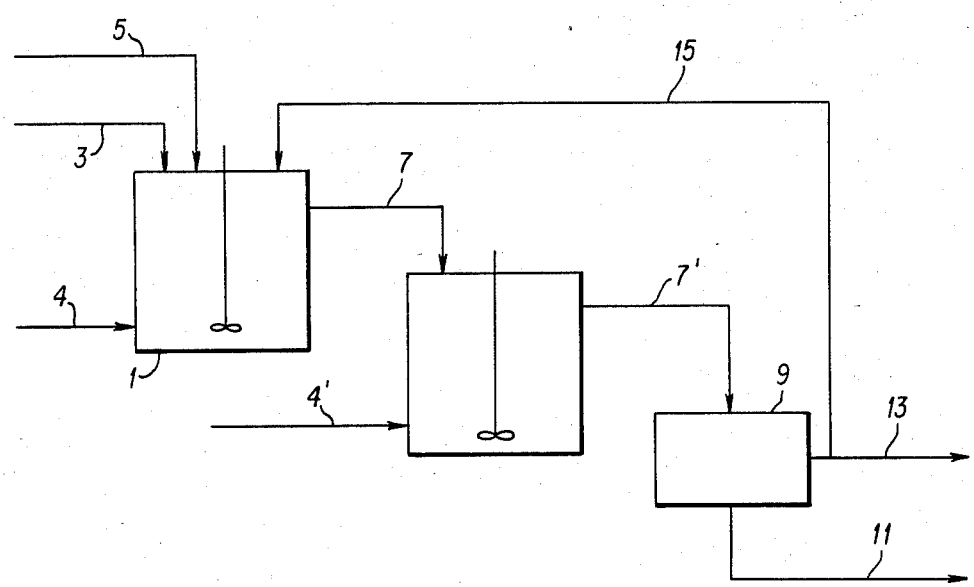
FIG. 6 is the process of FIG. 5 except that it contains a plurality of reaction vessels in series.

FIG. 6 shows the process scheme of FIG. 5 adapted for multiple reaction vessels. The scheme shows reaction vessel 2 provided with an ammonia feed line 4' for use when further ammonia addition is required.

Figure 7:
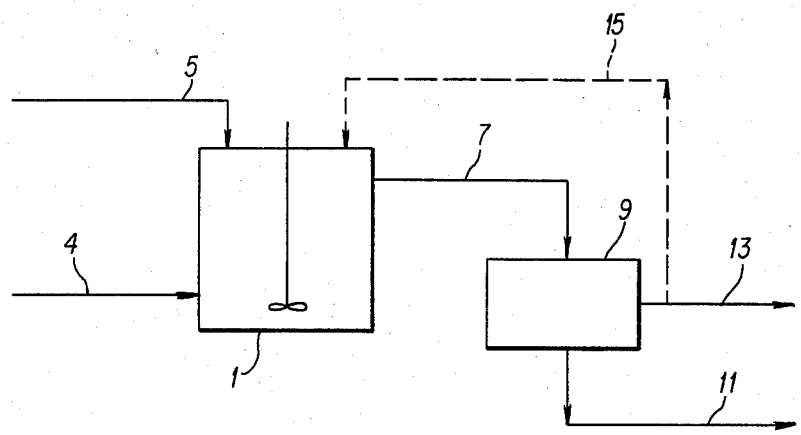
FIG. 7 represents an embodiment of the present process which features the in situ generation of solids within the reaction vessel and the recycle of solid seed material to the reaction vessel.

FIG. 7 shows the embodiment of the present process in which the reaction vessel 1 is adapted to receive wet process acid through line 5 and ammonia through line 4, with the reactants being agitated for a sufficiently long period of time to form a precipitate in situ without a solid seed material being initially present in the reaction vessel. As the continuous reaction proceeds, a portion of the isolated precipitated solids discharged from the phase separator through line 13 can be recycled to the reaction vessel 1 to provide solid seed for the impurity precipitation reaction.

Figure 8:
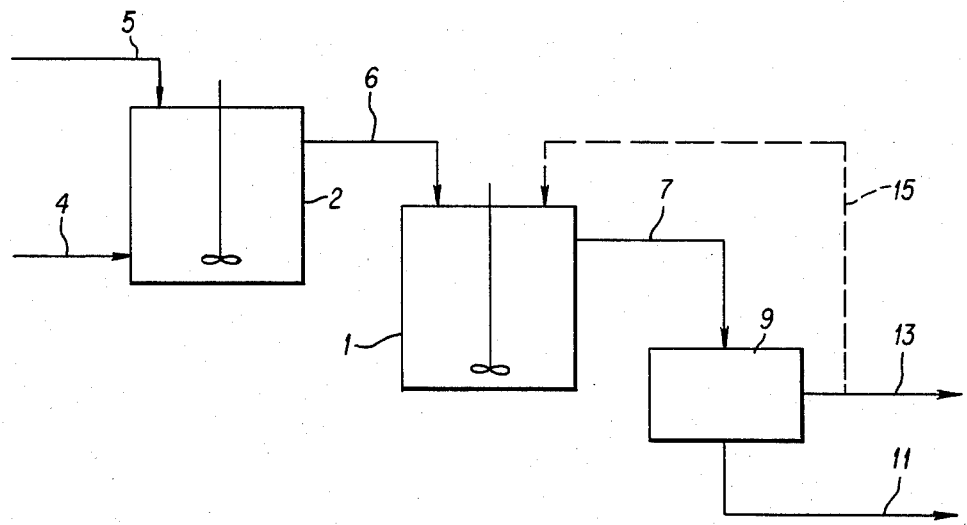
FIG. 8 represents an embodiment of the present process wherein solids are generated in situ in a prereactor and then the reaction mixture passes on to at least one reaction vessel with recycling of solid seed material to the reaction vessel.

FIG. 8 shows still another embodiment of the process in which ammonia and wet process acid are reacted in a prereactor 2 for a sufficient time to generate seed solids in situ as a slurry for the precipitation reaction process. Upon the preparation of a solids containing material in the prereactor, the mixture is discharged to reaction vessel 1 through line 6 for the completion of the impurity precipitation reaction. The reaction vessel normally contains either wet process phosphoric acid or ammoniated phosphoric acid. Solids can be recycled to reaction vessel 1 as needed as shown in other process schemes.

A critical aspect of all of the embodiments of the present invention is that during the aging time in which the impurities are being precipitated, the $N/P_2O_5$ weight ratio must be within a specific range. This range is normally from about 0.06 to about 0.15, preferably from about 0.08 to about 0.13, most preferably from about 0.09 to about 0.12. The precipitation of solid material at this low level $N/P_2O_5$ ratio means that a liquid ammoniated phosphoric acid product can be obtained which is substantially diminished in impurity content and which, because of its relatively low ammonia content, is an excellent starting material for the preparation of other fertilizer products. This is a major advantage over prior art ammoniation processes. The present liquid ammoniated phosphoric acid can be ammoniated to the appropriate pH level to obtain high purity monoammonium phosphate or high purity diammonium phosphate. The present liquid ammoniated phosphoric acid product is an excellent starting material for the preparation of both fluid and solid ammoniated polyphosphate fertilizers.

When producing ammoniated polyphosphate, the exothermic heat of reaction liberated when phosphoric acid is reacted with ammonia normally supplies a majority of the energy used to convert orthophosphate to the polyphosphate form. Because the ammonium ion content of the present liquid product is so relatively low, a substantial amount of phosphoric acid is available for reaction with ammonia for the release of enough energy to supply this energy need. Relatively higher level ammoniated phosphoric acid product such as monoammonium phosphate is unacceptable as a phosphate raw material because too much potential chemical energy has been used for the production of monoammonium phosphate. Not enough energy remains to convert the monoammonium phosphate to a polyphosphate without the use of an excessively large amount of costly, supplemental energy.

The relatively low $N/P_2O_5$ ratio of the present liquid ammoniated phosphoric acid is also beneficial when attempting to concentrate it. Highly concentrated feed acid or ammoniated phosphoric acid (i.e., 58-62% $P_2O_5$) is needed when producing ammoniated polyphosphate fertilizer. Concentrating the ammoniated phosphoric acid to this $P_2O_5$ level becomes increasingly more difficult as the $N/P_2O_5$ weight ratio increases. Concentration is relatively easily achieved at the present preferred range (0.08–0.13) but becomes essentially infeasible at $N/P_2O_5$ weight ratios above 0.15.

Phase separation is an important consideration in any process in which impurities are precipitated from wet process phosphoric acid. The higher the $N/P_2O_5$ ratio of a phosphoric acid-ammonia system, the more difficult phase separation becomes. Since impurity precipitation in the present process occurs at comparatively low $N/P_2O_5$ ratios, phase separation of precipitated solids is greatly facilitated. Consequently, the amount of by-product solid phase in the present process (without adversely affecting impurity removal) is less at the present lower $N/P_2O_5$ ratios. Prior art direct-ammoniation procedures operate at $N/P_2O_5$ ratios which by nature give poorer phase separation qualities and lower $P_2O_5$ yields in the product purified phosphoric acid. Phase separation is slower, larger separation equipment is needed and larger amounts of by-product solids can result.

The temperature over which the metal ion containing impurities precipitate with aging in all embodiments of the present invention should be sufficient to effect precipitation. Normally, the reaction temperature is maintained within the range of about 52° to about 108° C., preferably about 60° to about 99° C., most preferably about 77° to about 93° C. The pressure over the reaction medium is usually ambient pressure since no advantage is gained by using higher pressures. However, increased pressure should not adversely affect the present invention.

The time of aging is important to the extent that it must be long enough for the above-mentioned complex metal salts to form in the presence of impurity seed material in the reactor and to precipitate from solution. Reaction times as low as about one hour can be used. The preferred time of aging is 2 to 16 hours with a most preferred aging time ranging from 3 to 8 hours.

In the ammoniation process of the present invention any source of ammonia can be used which is utilized in state-of-the-art phosphate ammoniation processes. Suitable ammonium ion sources include ammonia, aqueous ammonia (ammonium hydroxide), monoammonium phosphate, diammonium phosphate and ammonium polyphosphate.

An outstanding feature of the present process is that it is not limited to any particular grade of wet process acid such as highly dilute acid, i.e., 20% $P_2O_5$, or highly concentrated super phosphoric acid, i.e., 66-76% $P_2O_5$ as required by other processes. Any phosphoric acid material varying over the range of 23-62% $P_2O_5$ can be used in the present process. Expensive Merchant grade acid, i.e., phosphoric acid which has been concentrated, allowed to precipitate some of its impurities and then clarified, is not required for the present invention. Also, the present invention does not require phosphoric acid having a relatively low fluorine concentration, which is a stringent requirement of the Weston et al prior art reference.

An adequate amount of active solids must be maintained in the wet process acid-ammonium ion system if efficient impurity precipitation is to be obtained. Precipitation will not occur at the present $N/P_2O_5$ ratio range of 0.06-0.15 in the absence of active solids unless an extremely long reactor residence time is provided. In studies involving the continuous processing of wet process acid and ammonia, without initially introducing seed solids, no impurity precipitation occurred at a $N/P_2O_5$ weight ratio of 0.10, a temperature of 77° C. and a reactor residence time of 4 hours. However, when seed solids were introduced, impurity precipitation occurred under these reaction conditions.

Solids can be recycled to the reactor to increase the mass of seed material in order to facilitate optimum precipitation. This is achieved, however, with some sacrifice in phase separation since the presence of greater amounts of undissolved solids makes phase separation more difficult. Phase separation must be balanced against impurity precipitation efficiency in commercial operation.

The composition of the seed solids is important insofar as they must be able to promote the formation and precipitation of the above described complex metal salts. The seed solids can be obtained from several sources such as wet process MAP or by in situ generation of the solids as described above.

Separation of solid and liquid phases in the present reaction system upon completion of solids precipitation can be accomplished by any well-known conventional method of industrially separating mixed solid and liquid materials such as by filtration, sedimentation or the like.

As stated above, the process of the present invention can be conducted in batch, semicontinuous or continuous processes. Of course for industrial scale operations, continuous processing is preferred in order to conduct the reaction with maximum efficiency.

The liquid ammoniated phosphoric acid product of the present invention can be converted to a variety of useful products. The liquid product may be used in the preparation of solid products such as granular or powdered fertilizer materials and granular or powdered technical-grade phosphates. The present liquid product may be converted to a variety of liquid products which include orthophosphate solutions, polyphosphate liquid fertilizers and concentrated monoammonium and diammonium phosphate solutions. The present liquid product may also be converted to liquid suspensions of ammonium polyphosphate, suspensions of ammonium orthophosphates and suspensions of the liquid product containing additional fertilizer ingredients such as ammonium nitrate and potash.

Byproduct solid phase from the present invention is also a usable fertilizer material. It contains a substantial amount of $P_2O_5$ and metals such as magnesium, iron, and the like which are beneficial micronutrients for some plants. The solid phase may be used as-is or blended with phosphoric and/or sulfuric acids and further processed to N-P and N-P-K fertilizer products. For example, byproduct solid phase and wet process phosphoric acid were mixed in proportions (and with chemical analyses) as shown in the following table.

|  | Byproduct Solids | Wet Process Phosphoric Acid |
| --- | --- | --- |
| Component weight, LBS | 18,000 | 15,946 |
| % $P_2O_5$ | 37.5 | 27.8 |
| % MgO | 1.68 | 0.34 |
| % $Fe_2O_3$ | 4.19 | 0.70 |
| % $Al_2O_3$ | 3.71 | 0.86 |
| % N | 3.75 | 0 |

The mixture was then combined with muriate of potash (KCl), sulfuric acid and ammonia in a fertilizer granulation plant to produce a granular fertilizer containing 13% N, 13% $P_2O_5$ and 13% $K_2O$ (i.e., 13-13-13).

Still further, the by-product solid phase material can be directly ammoniated and then dried to produce a powdered phosphate fertilizer material.

Having now generally described the invention, a further understanding can be obtained by reference to certain specific examples which are provided herein for purpose of illustration only and are not intended to be limiting unless otherwise specified.

EXAMPLE 1

The following procedure is an example of the mode of the present invention in which crude MAP obtained by the ammoniation of wet process acid is used as the source of seed solids for the purification of ammoniated wet process acid.

Into a reaction vessel was placed 100 g of wet process phosphoric acid having a $P_2O_5$ content of 27.8 wt. % and a MgO content of 0.39 wt. %. To the reactor was also fed 94.3 g of solid, crude wet process monoammonium phosphate (MAP) having a $P_2O_5$ content of 53.8 wt. %, an MgO content of 0.86 wt. % and a nitrogen content of 10.8 wt. %. The contents of the vessel were maintained at 63° C. at a residence time of about 16 hours after which the solid and liquid phases were separated by laboratory vacuum filtration. The product liquid phase weighing 287 g (including 200 g of water used to wash the solid phase) had a $P_2O_5$ content of 20.1 wt. % and a MgO content of 0.055 wt. %. The byproduct solid phase weighing 45.9 g had a $P_2O_5$ content of 45.3 wt. % and a MgO content of 2.26 wt. %. The difference in total weight in and total weight out is attributed to water evaporated during the reaction.

From the above data it is evident that 0.81 g of MgO was placed into the reactor vessel with the crude solid MAP. If no MgO precipitated during the process, the same amount should be in the solid phase removed from the reactor. However, 1.04 g of MgO were found in the solid phase after phase separation thereby indicating about a 59% precipitation of MgO originally present in the feed wet process phosphoric acid.

EXAMPLE 2

The following example is representative of a preferred embodiment of the invention in which the necessary active solids are generated in situ.

A 4.5 gal amount of wet process phosphoric acid having the following analysis was fed into a 7 gallon capacity reactor which was equipped with an agitator and an ammonia sparger.

| Acid Analysis | |
|---|---|
| Wt. % Components | Impurity/$P_2O_5$ ratio |
| % $P_2O_5$ = 26.7 | |
| % MgO = 0.31 | 0.0116 |
| % $Al_2O_3$ = 0.82 | 0.0307 |
| % $Fe_2O_3$ = 0.93 | 0.0348 |
| % $SiO_2$ = 0.08 | 0.003 |
| % F = 1.62 | 0.0607 |

The acid was preheated to 65.5° C. and ammonia was sparged slowly into the reactor under agitation over a ten hour period until the $N/P_2O_5$ ratio reached 0.19. Solids first began to appear in the reactor at a $N/P_2O_5$ ratio of about 0.12.

Additional wet process phosphoric acid was then fed into the reactor at a rate of 0.011 gal/min without the coaddition of ammonia until the $N/P_2O_5$ ratio decreased to 0.11. The reactor temperature was maintained at about 77° C. At this point the feeding of ammonia to the reactor was commenced at a rate of 0.004 lb per minute along with the acid feed at rates sufficient to maintain the 0.11 $N/P_2O_5$ weight ratio. The process was operated continuously under these conditions, at a reactor residence time of 4 hours, for a 20-hour period.

During the course of the test run, samples were taken from the reactor and phase separation was performed. A typical analysis of the liquid phase product is shown below.

| Liquid Phase Analysis | |
|---|---|
| wt. % components | Impurity/$P_2O_5$ ratio |
| $P_2O_5$ = 30.5 | |
| MgO = 0.19 | 0.0062 |
| $Al_{23}$ = 0.65 | 0.0213 |
| $Fe_2O_3$ = 0.41 | 0.013 |
| $SiO_2$ = 0.07 | 0.0023 |
| F = 1.28 | 0.0420 |

Weight percent yield of $P_2O_5$ was 82%. Also, there was substantial reduction of all impurities in the ammoniated phosphoric acid.

EXAMPLE 3

The following example is representative of an embodiment of the invention in which wet process phosphoric acid is ammoniated to only within the limits of the desired low $N/P_2O_5$ range (0.06–0.15) and the mixture is allowed to stand for a prolonged period of time until active, solid material precipitates.

Approximately 2 liters of wet process phosphoric acid having the following analysis was placed in a 4 L beaker equipped with a stirrer and an ammonia sparger.

| Acid Analysis | |
|---|---|
| wt. % components | Impurity/$P_2O_5$ ratio |
| % $P_2O_5$ = 26.6 | |
| % MgO = 0.44 | 0.0165 |
| % $Al_2O_3$ = 0.75 | 0.0282 |
| % $Fe_2O_3$ = 0.82 | 0.0308 |

The acid was heated to 88° C. and ammonia was sparged slowly into the beaker under agitation over a 5 hour period until the $N/P_2O_5$ ratio reached 0.12. The ammonia and heat to the beaker was then turned off and the reactor contents were allowed to stir overnight. On the following morning the beaker contained 4% solids. However, analysis of the liquid phase showed that no significant reduction in Mg content had occurred.

The beaker was reheated to 88° C. and allowed to stir an additional 12 hours. Water was added occasionally to replace that which was lost by evaporation, but no further ammonia was added. After the additional 12 hours reaction time, the beaker contained 23% solids. Subsequent phase separation gave a liquid phase having the following analysis. The data show that 72% of the magnesium was removed from the starting acid.

| Liquid Phase Analysis | |
|---|---|
| wt. % components | Impurity/$P_2O_5$ ratio |
| % $P_2O_5$ = 21.7 | |
| % MgO = 0.10 | 0.0046 |
| % $Al_2O_3$ = 0.12 | 0.0055 |
| % $Fe_2O_3$ = 0.04 | 0.0018 |

EXAMPLE 4

The following example is representative of a preferred embodiment of the invention in which the necessary active solids are generated in situ in a pilot plant scale system and solids are recycled to the reactor to enhance impurity removal efficiency.

A 375 gal closed-top tank equipped with agitator, heating/cooling coil, and ammonia sparger was filled ½ full with wet process phosphoric acid having the following analysis.

| Acid Analysis | |
|---|---|
| wt. % components | Impurity/$P_2O_5$ ratio |
| % $P_2O_5$ = 27.9 | |
| % MgO = 0.34 | 0.0122 |
| % $Al_2O_3$ = 0.86 | 0.0308 |
| % $Fe_2O_3$ = 0.70 | 0.0251 |

Ammonia was sparged into the reactor under agitation over a four hour period until the $N/P_2O_5$ weight ratio reached 0.20. Temperature was monitored during the ammoniation and cooling water was used when required to control the reactor at 82°–88° C. When a 0.20 $N/P_2O_5$ weight ratio was reached, ammonia addition was stopped and wet process phosphoric acid feed was started at about ½ gal per minute. Phosphoric acid addition was continued, reducing the reactor $N/P_2O_5$ to the desired operating level over a 4 hour period. Ammonia feed was then restarted to maintain the desired $N/P_2O_5$ of 0.12.

When the desired reactor slurry level was reached, reactor slurry feed was started to a horizontal belt vacuum filter. Product filtrate was routed to storage and byproduct solids were recycled to the reactor to raise the % solids to a level of 30–35%. When the desired solids level was reached, a portion of the byproduct solids was routed to storage and the remainder continued to be recycled to the reactor to maintain the desired solids level. The reactor was then operated continuously at a reactor residence time of about 6 hours and a temperature of about 82° C.

The following is an analysis of the product liquid phase produced in this manner after a period of operation sufficient to reach steady state, continuous operating conditions.

| Liquid Phase Analysis | |
|---|---|
| wt. % components | Impurity/$P_2O_5$ ratio |
| $P_2O_5$ = 26.3 | |
| MgO = 0.15 | 0.0057 |
| $Al_2O_3$ = 0.47 | 0.0179 |
| $Fe_2O_3$ = 0.18 | 0.0069 |

The data show that there was a 53% reduction of magnesium in the liquid phase, with reduction in iron and aluminum impurities as well.

EXAMPLE 5

To identify the magnesium containing precipitate obtained during the purification of wet process acid, the precipitate was prepared using reagent chemicals.

Solution 1 was prepared from reagent grade $H_3PO_4$, $NH_4OH$ solution, $AlNH_4(SO_4)_2.12H_2O$, $MgCO_3$, HF and distilled water. This solution was stirred for seven hours at 88° C. with addition of distilled water to maintain constant volume. The reaction slurry was then filtered to yield Solution 2, demonstrating substantial precipitation of magnesium.

| Solution 1 | |
|---|---|
| Liquid Phase Analysis Wt. % Component | |
| $P_2O_5$: | 24.09 |
| N: | 4.14 |
| MgO: | 0.60 |
| $Al_2O_3$: | 0.69 |
| F: | 1.46 |

| Solution 2 | |
|---|---|
| Liquid Phase Analysis Wt. % Component | |
| $P_2O_5$: | 23.57 |
| N: | 4.37 |
| MgO: | 0.11 |
| $Al_2O_3$: | 0.02 |
| F: | 1.58 |

The solid precipitate was then washed with 88° C. distilled water and dried at 105° C. The x-ray diffraction pattern of this precipitate is given below. No such pattern was found in the literature indicating that this is a previously unreported compound.

| Position (2θ) | D (Å) | $I/I_o$ |
|---|---|---|
| 11.008 | 8.0311 | 100.0 |
| 13.303 | 6.6499 | 27.3 |
| 14.397 | 6.1471 | 5.7 |
| 19.730 | 4.4960 | 10.4 |
| 21.268 | 4.1742 | 10.4 |
| 21.954 | 4.0453 | 21.7 |
| 25.227 | 3.5274 | 44.7 |
| 26.782 | 3.3260 | 5.1 |
| 27.364 | 3.2565 | 32.0 |
| 29.081 | 3.0681 | 43.6 |
| 31.676 | 2.8224 | 5.8 |
| 33.468 | 2.6753 | 9.0 |
| 33.781 | 2.6512 | 33.1 |
| 35.870 | 2.5014 | 11.8 |
| 36.314 | 2.4718 | 6.0 |
| 38.960 | 2.3098 | 8.4 |
| 41.582 | 2.1701 | 6.6 |
| 44.745 | 2.0237 | 6.4 |
| 51.753 | 1.7650 | 16.7 |

Chemical analysis of the dry precipitate gave: Mg=6.25%; Al=7.18%; N=3.87%; F=8.59%; P=17.12%. This composition agrees (with allowance for hydroxide substitution for fluoride) with a theoretical composition of: $MgAlNH_4(HPO_4)_2F_2.4H_2O$ (theoretical analysis: Mg=6.54%; Al=7.27%; N=3.77%; F=10.23%; P=16.69%).

The x-ray diffraction pattern of the dry solids obtained from Example 4 showed $Fe(NH_4)(HPO_4)_2.0.5H_2O$ (Haseman J.F., Lehr, J.R. and Smith, J.P., *Soil Science Soc. Am Proc.* 15, 76–84 (1950)) and the above magnesium containing salt present as the major constituents.

Experiments with reagent chemicals identical to that above, except that magnesium was deleted, gave only $AlNH_4PO_4F_2$ (Akiyama T., and Ando J., *Bulletin of the Chemical Society of Japan*, Vol. 45, 2915–2920 (1972). Although this compound was not found in the x-ray diffraction pattern of solids from wet process acid, chemical analysis suggests that it is present as a minor constituent.

Experiments with reagent chemicals identical to that above, except that aluminum was deleted, gave no magnesium containing precipitate.

Having now fully described this invention, it will be apparent to one of ordinary skill in the art that many changes and modifications can be made thereto without departing from the spirit or scope of the invention as set forth herein.

What is claimed as new and is intended to be secured by Letters Patent is:

1. A method of preparing a purified ammoniated phosphoric acid composition, comprising:

reacting an aqueous wet process phosphoric acid having a $P_2O_5$ content of 23-62% with an ammonium ion source at a $N/P_2O_5$ weight ratio ranging from about 0.06 to about 0.15 in the presence of solid phase metal ion containing impurities for a time sufficient to precipitate the majority of the metal impurities in said acid, said impurity precipitation comprising at least several complex metal salts, one of which contains magnesium, aluminum and fluoride ions; and obtaining said purified ammoniated phosphoric acid by separating said precipitated impurities therefrom.

2. The method of claim 1, wherein the time for the precipitation of said impurities is at least one hour.

3. The method of claim 2, wherein the time of precipitation of said impurities ranges from 2 to 16 hours.

4. The method of claim 3, wherein said time of precipitation ranges from 3 to 8 hours.

5. The method of claim 1, wherein said $N/P_2O_5$ ratio ranges from 0.08 to 0.13.

6. The method of claim 5, wherein said $N/P_2O_5$ ratio ranges from 0.09-0.12.

7. The method of claim 1, wherein said impurity precipitation reaction occurs at a temperature of 52°-108° C.

8. The method of claim 7, wherein said temperature ranges from 60°-99° C.

9. The method of claim 8, wherein said temperature ranges from 77°-93° C.

10. The method of claim 1, wherein said precipitated complex metal salts include the following salts:

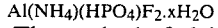

11. The method of claim 1, wherein said metal complex salt containing magnesium, aluminum and fluoride ions is $MgAl(NH_4)(HPO_4)_2F_2.4H_2O$.

12. The method of claim 1, wherein said solid phase metal ion containing impurities are present in said reaction medium in the form of added crude wet process monoammonium phosphate.

13. The method of claim 1, wherein said reaction is initiated by adding metal ion containing impurities obtained from crude wet process ammonium phosphate, to wet process phosphoric acid solution containing ammonium ions in an amount such that the $N/P_2O_5$ weight ratio is within the stated range.

14. The method of claim 1, wherein said solid phase metal ion containing impurities are obtained by reacting wet process phosphoric acid with an ammonium ion source at a $N/P_2O_5$ ratio of at least 0.15, thereby obtaining precipitation of said solid phase metal ion containing impurities; and recycling the precipitated solids to wet process phosphoric acid solution containing ammonium ions in an amount such that the $N/P_2O_5$ ratio is within the stated range.

15. The method of claim 1, wherein said solid phase metal ion containing impurities are obtained as a slurry by reacting wet process phosphoric acid with an ammonium ion source for a prolonged period of time sufficient to obtain the impurities, and then adding the slurry to wet process phosphoric acid or ammoniated phosphoric acid to initiate the precipitation process.

16. The method of claim 1, wherein said wet process acid has a $P_2O_5$ content ranging from 23-62% $P_2O_5$.

17. The method of claim 1, wherein said ammonium ion source is ammonia.

18. The method of claim 1, wherein said ammonium ion source is ammonium hydroxide.

19. The method of claim 1, wherein said ammonium ion source is monoammonium phosphate, diammonium phosphate or ammonium polyphosphate.

20. The method of claim 1, wherein a portion of the precipitated impurities which have been separated from the ammoniated phosphoric acid are recycled to the phosphoric acid - ammonia reactor, providing additional seed solids thus enhancing impurity precipitation.

21. The method of claim 1, wherein the precipitated, separated impurities are further processed into a solid phosphatic fertilizer material.

22. The method of claim 21, wherein the separated impurities are further processed by mixing with phosphoric and/or sulfuric acids and subsequently ammoniated in a fertilizer granulation process.

23. The method of claim 21, wherein the separated impurities are ammoniated further and dried to produce a powdered phosphatic fertilizer material.

24. The method of claim 21, wherein the solid phosphatic material is relatively high in micronutrients.

25. A method of preparing a purified ammoniated phosphoric acid composition, comprising:

(a) reacting an aqueous wet process phosphoric acid having a $P_2O_5$ content of 23-62% with an ammonium ion source at a $N/P_2O_5$ weight ratio ranging from about 0.06 to about 0.15;

(b) seeding said aqueous acid with a mixture of complex metal salts one of which has the formula: $MgAl(NH_4)(HPO_4)_2F_2.4H_2O$ in order to affect precipitation of contaminating metal ions in said wet process acid; and (c) obtaining said purified ammoniated phosphoric acid by separating said precipitated impurities therefrom.

26. A method of preparing a purified ammoniated phosphoric acid composition, comprising:

reacting an aqueous wet process phosphoric acid having a $P_2O_5$-content of 23-62% with an ammonium ion source at a $N/P_2O_5$ weight ratio ranging from about 0.06 to about 0.15 in the presence of solid phase metal ion containing impurities for a time sufficient to precipitate the majority of the metal impurities in said acid, said impurity precipitation comprising at least several complex metal salts, one of which contains magnesium, aluminum, ammonium, phosphate and fluoride ions and has the following X-ray diffraction pattern:

| Position (2θ) | D (A°) | I/I$_o$ |
| --- | --- | --- |
| 11.008 | 8.0311 | 100.0 |
| 13.303 | 6.6499 | 27.3 |
| 14.397 | 6.1471 | 5.7 |
| 19.730 | 4.4960 | 10.4 |
| 21.268 | 4.1742 | 10.4 |
| 21.954 | 4.0453 | 21.7 |
| 25.227 | 3.5274 | 44.7 |
| 26.782 | 3.3260 | 5.1 |
| 27.364 | 3.2565 | 32.0 |

-continued

| Position (2θ) | D (A°) | I/I$_o$ |
|---|---|---|
| 29.081 | 3.0681 | 43.6 |
| 31.676 | 2.8224 | 5.8 |
| 33.468 | 2.6753 | 9.0 |
| 33.781 | 2.6512 | 33.1 |
| 35.870 | 2.5014 | 11.8 |
| 36.314 | 2.4718 | 6.0 |

-continued

| Position (2θ) | D (A°) | I/I$_o$ |
|---|---|---|
| 38.960 | 2.3098 | 8.4 |
| 41.582 | 2.1701 | 6.6 |
| 44.745 | 2.0237 | 6.4 |
| 51.753 | 1.7650 | 16.7; and | obtaining said purified ammoniated phosphoric acid by separating said precipitated impurities therefrom.

* * * * *